March 9, 1937.  E. W. RIFFEY  2,073,179
INTERNAL COMBUSTION ENGINE
Filed Aug. 24, 1933
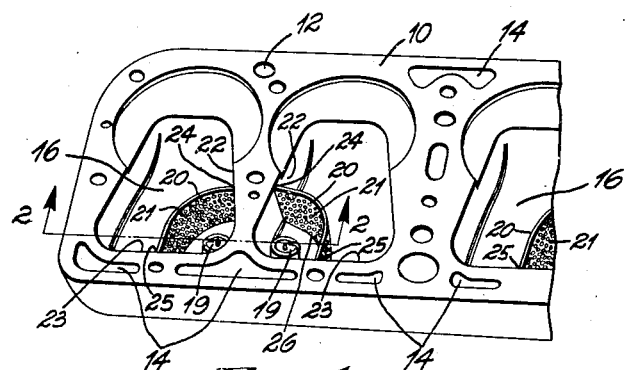
*Fig.1*
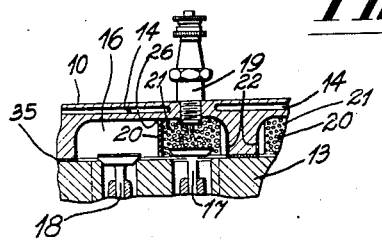
*Fig.2*
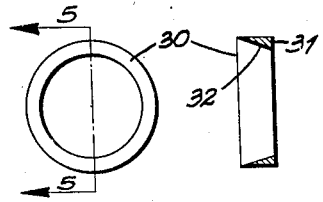
*Fig.4*  *Fig.5*
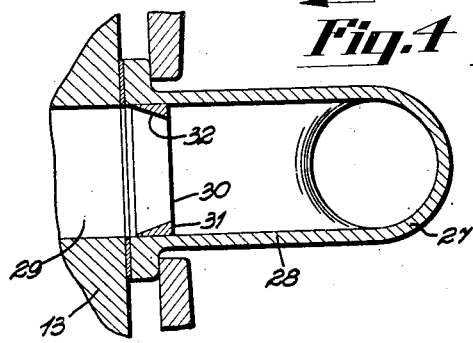
*Fig.3*
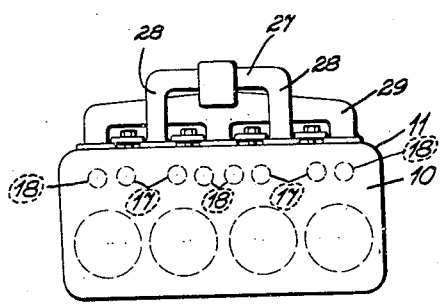
*Fig.6*
INVENTOR
Edgar W. Riffey
BY Marechal & Noe
ATTORNEY Patented Mar. 9, 1937

2,073,179

UNITED STATES PATENT OFFICE 2,073,179

INTERNAL COMBUSTION ENGINE

Edgar W. Riffey, Springfield, Ohio, assignor of one-third to Virgil H. Kirkham, Springfield, Ohio Application August 24, 1933, Serial No. 686,520

2 Claims. (Cl. 123—191)

This invention relates to internal combustion engines and more particularly to engines in which the combustion chamber is supplied with a fuel mixture that is ignited by means of a spark plug or the like.

One object of the invention is the provision of a cheap cylinder head construction designed to increase the economy of fuel consumption and adapted for operation on lower grades of gasoline.

Another object of the invention is the provision of a foraminous partition in the combustion chamber of an internal combustion engine, arranged to partition the space around the spark plug from the portions of the combustion chamber including the exhaust valve and the cylinder space.

Still another object of the invention is the provision of a partition of the character mentioned having a permanent connection to the walls of the cylinder head and terminating closely adjacent the cylinder block.

A further object of the invention is the provision of an internal combustion engine having a shouldered obstruction in the intake passage through which fuel mixture is supplied to the intake valve, and adapted to provide for gradual expansion of the mixture after passing the shoulder.

Other objects and advantages of the invention will be apparent from the following description, the appended claims and the accompanying drawing, in which—

Fig. 1 is a perspective view of a portion of a cylinder head of an engine embodying the present invention;

Fig. 2 is a vertical section through a combustion chamber, taken on the line 2—2 of Fig. 1;

Fig. 3 is a vertical section through a portion of the intake manifold;

Fig. 4 is an end view of the ring provided in the intake passage;

Fig. 5 is a section on the line 5—5 of Fig. 4; and

Fig. 6 is a top plan view of the engine of the present invention.

Referring more particularly to the drawing by reference numerals, the numeral 10 designates the cylinder head of the internal combustion engine 11. This cylinder head is provided with suitable attaching bolt holes 12 by means of which it may be detachably connected to the cylinder block 13 of the engine in the customary manner, and, as is the usual practice, suitable passages 14 are provided for the passage of cooling water.

As herein shown, the engine 11 is provided with four cylinders although obviously a greater or lesser number of cylinders may be employed. At one side of each cylinder, the combustion chamber 16 is provided with inlet and exhaust valves 17 and 18 respectively, arranged for reciprocatory movement in the cylinder block in the usual manner. In the wall of the cylinder head is a spark plug 19, preferably provided adjacent the intake valve, it being understood that the several combustion chambers are all of similar construction and arrangement. As herein shown the combustion chamber is of maximum height adjacent the inlet and exhaust valve positions.

In each combustion chamber is a partition 20, permanently connected to the cylinder head and arranged to partition the space including the spark plug and inlet valve from the remaining portion of the combustion chamber space. The partition 20 is a plate of steel or the like, having a large number of small holes 21. These holes may be about ⅛" in diameter and about seventy in number, although, of course, the number of holes in each partition, and the diameter of the holes may be somewhat greater or lesser than the particular figures indicated. Using about seventy holes of about ⅛" diameter gives a total area of about a square inch through which the gasoline and air mixture travels in its passage to the cylinder space as the piston moves down on a suction stroke. This total area of about a square inch is divided up, however, into a large number of individual passages so as to give a large number of comparatively small streams as distinguished from only a few passages of much larger size. If more than seventy holes are used, the hole diameter is preferably somewhat less than ⅛".

The partition 20 is preferably curved so as to extend from a side wall portion 22 of the cylinder head to an adjacent side wall portion 23 thereof, the ends of the partition, as shown, being welded as at 24 and 25 where they are in contact with the cylinder head. The vertical extent of the partition is such that it extends from the welded curved line of attachment 26 down into quite close proximity to the horizontally extending portions of the cylinder head, as shown in Fig. 2, although there is a small space between the lower end of the partition and the cylinder block that provides for expansion of the parts.

Fuel mixture is supplied from a carbureter of any suitable or well-known character to the intake manifold 27, as shown in Fig. 6. The intake manifold is provided with branch passages 28 leading to the inlet passages 29 in the cylinder block. The exhaust gases flow out past the exhaust valves 18 to the exhaust manifold 29', the intake and exhaust manifolds being preferably out of contact with one another so that the fuel and air mixture passing to the engine will not be unduly heated. The flow of fuel mixture, while passing through the branch passages 28, is restricted to some extent by means of rings 30, the rings 30 each having a force fit in their corresponding manifold passages 28. These rings present a shoulder 31 to the flow of fuel mixture, and are tapered as shown at 32 so as to offer a cross-sectional passage which increases gradually from the point of restriction adjacent the shoulder 31 to the end of the ring which is closest to the cylinder block. It has been found that especially with the lower grades of gasoline, the restriction offered by the shoulder 31, together with the gradually increasing cross-sectional passage for the gas mixture after passing the restriction gives a turbulent action, combined with a gradual expansion, which intimately mixes the fuel and air and insures complete volatilization of the fuel.

The partition 20 may be very economically made and applied to an existing cylinder head by arc welding, or it may be made as a part of the cylinder head, if desired. If made as an auxiliary to an existing cylinder head the compression ratio may be kept the same by slightly increasing the thickness of the gasket 35 to compensate for the space taken up by the partition. If the gasket of the existing engine is retained, a slight increase in compression ratio may be obtained with some increase in work and efficiency.

The foraminous partition provided around the inlet valve 17 and the spark plug 19, to some extent separates the portion of the combustion chamber including those elements from the remaining portion including the exhaust valve and the cylinder space. The exit of the burned gases from the combustion chamber is not unduly obstructed. The change in the construction from the ordinary form is, of course, quite economically and readily made, but it has been found that the fuel economy is greatly improved, in fact even doubled, without increasing the compression ratio. The maximum work output of the engine is also increased quite considerably. The partition enables the engine to operate on low grade gasoline or even kerosene. It seems probable that the partition is heated by the burning gases, and as the incoming fuel and air mixture passes through the large number of holes provided in the partition, the fuel and air are more intimately mixed together and also heated and entirely vaporized. Also it seems that the ignition starts in the partitioned chamber around the intake valve and spark plug and then spreads out to the remaining portions of the combustion chamber without producing the knocking tendency and without pre-ignition. The partition is not hot enough to cause pre-ignition of the fuel, as it has an intimate connection to the walls of the cylinder head which are, of course, cooled by the circulating water, so that the partition is enabled to maintain a proper temperature for effective operation.

As the partition 20 is integrally connected to the cylinder head, and removable with the cylinder head, there are no bolts to burn off or become loose within the combustion chamber. The spark plug is freely accessible, however, when the cylinder head is removed, as will be readily apparent from Fig. 1. It has also been found that the spark plug does not become fouled with carbon deposits as all of the fuel in the mixture is effectively burned.

The partition 20 may be employed in an engine of the ordinary construction such as the automobile engines now on the market, for using ordinary gasoline, but it is desirable that when the partition is employed, the fuel mixture supplied to the engine be not unduly heated, especially when the more volatile fuels are used. Hot spots in the intake manifold are, therefore, preferably avoided. The tapered rings 30 provided in the intake manifold, provide for a more thorough mixing of the fuel and gas that are supplied to the engine, these rings 30 being preferably employed in conjunction with the foraminated partition 20 for the lower grades of gasoline. The rings 30, however, may be employed to advantage in engines of the ordinary construction.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a four-cycle internal combustion engine, a cylinder block and a cylinder head attached thereto and providing a combustion chamber therewith, an intake valve for governing the entire supply of air and fuel as an explosive mixture to the combustion chamber, an exhaust valve for the exhaust of burned gases from said combustion chamber, a spark plug for igniting the fuel and air mixture supplied through said intake valve, and a foraminous vertical partition spaced from said spark plug and intake valve and enclosing the same so as to separate these parts from the exhaust valve and portions of the combustion chamber and cylinder space, and providing for a preliminary ignition of a portion of the body of gas which is distributed through the openings in said foraminous partition in a plurality of radial directions through said foraminous partition, said partition having an integral connection to the cylinder head and extending down from the cylinder head substantially to the cylinder block, said foraminous partition being permanently attached to the underside of the top of the cylinder head.

2. In an internal combustion engine, a cylinder block and a cylinder head attached thereto and providing a combustion chamber therewith, an intake valve for governing the entire supply of air and fuel as an explosive mixture to the combustion chamber, an exhaust valve for the exhaust of burned gases from said combustion chamber, a spark plug for igniting the fuel and air mixture supplied through said intake valve, and an arcuate foraminous vertical partition spaced from said spark plug and intake valve and enclosing the same so as to separate these parts from the exhaust valve and portions of the combustion chamber and cylinder space, and providing for a preliminary ignition of a portion of the body of gas which is distributed through the openings in said foraminous partition in a plurality of radial directions through said foraminous partition, said partition having an integral connection to the cylinder head and extending down from the cylinder head substantially to the cylinder block, said foraminous partition being permanently attached to the underside of the top of the cylinder head.

EDGAR W. RIFFEY.